May 15, 1956  E. L. DETROW  2,745,187
DEVICE FOR ORIENTING TAPS FOR GRINDING
Filed Jan. 30, 1953
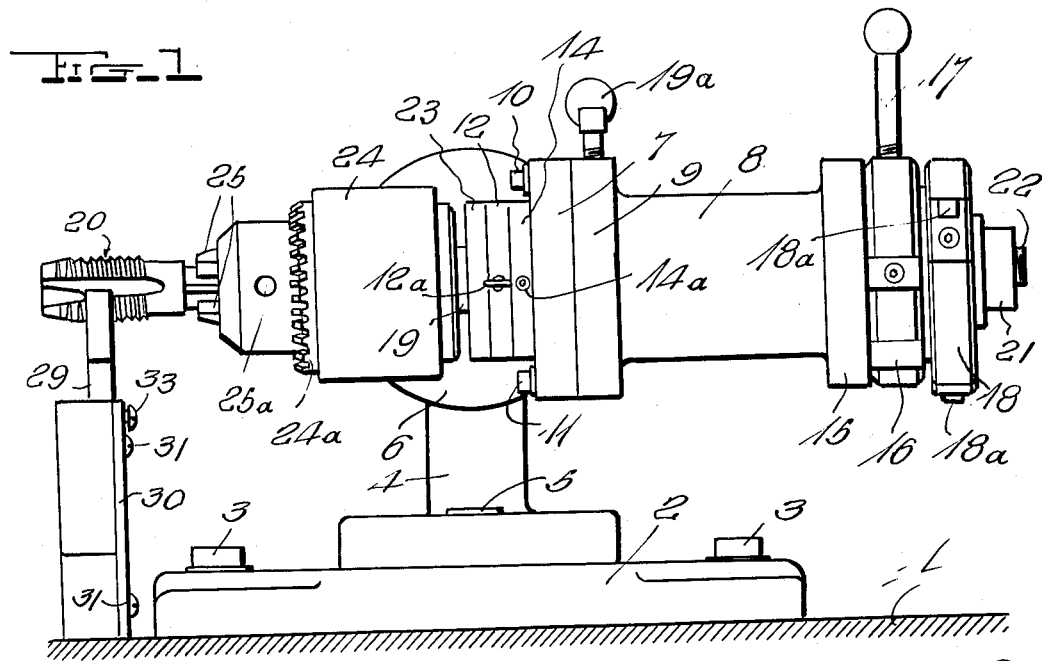
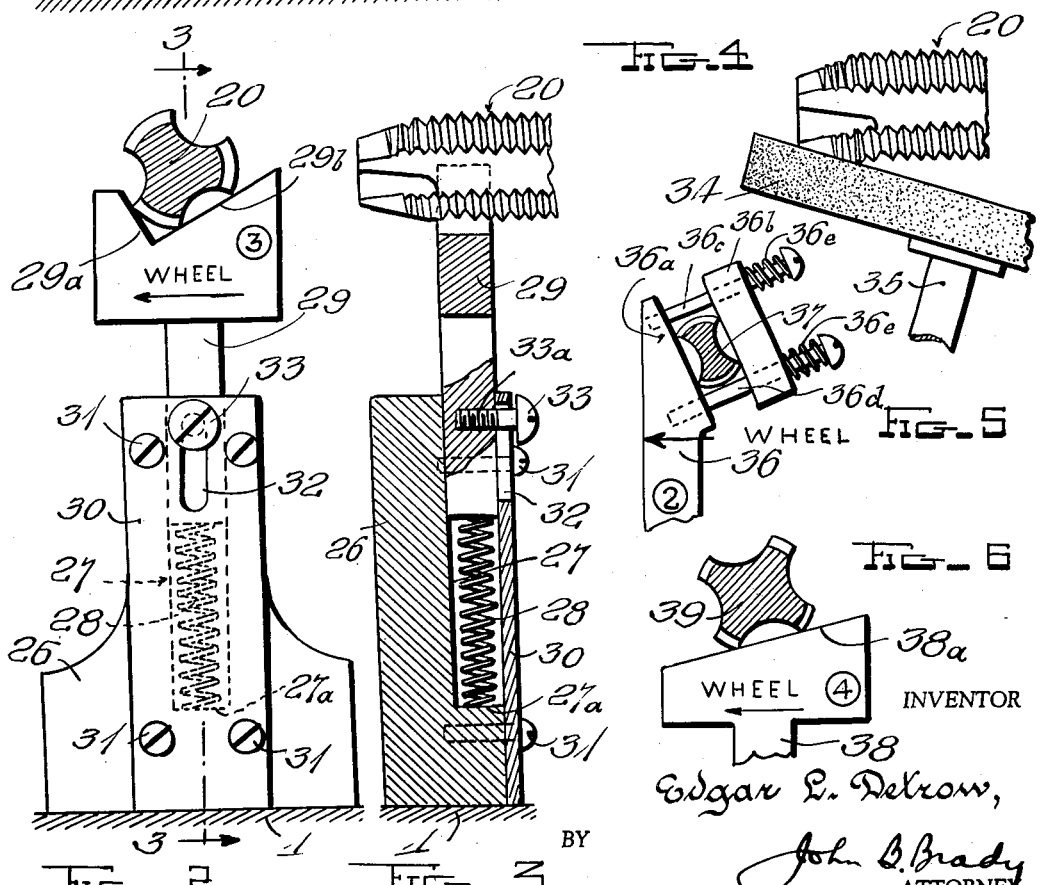
INVENTOR
Edgar L. Detrow,
BY John C. Brady
ATTORNEY

United States Patent Office 2,745,187
Patented May 15, 1956

2,745,187

DEVICE FOR ORIENTING TAPS FOR GRINDING

Edgar L. Detrow, Boonsboro, Md., assignor to Vulcan Machine Company, Waynesboro, Pa., a corporation of Pennsylvania Application January 30, 1953, Serial No. 334,247

6 Claims. (Cl. 33—185)

My invention relates broadly to machine tools and more particularly to a precision gauge for setting the position of taps in a tap-grinding fixture for grinding the tap on a predetermined angle.

One of the objects of my invention is to provide a construction of precision gauge including a multiplicity of tap-setting anvil heads pre-ground at predetermined angles for coaction with taps of different numbers of flutes for orienting the tap in the tap-grinding fixture preparatory to the securing of the tap in position in the tap-grinding fixture.

Still another object of my invention is to provide a construction of precision gauge including a multiplicity of tap-setting gauge heads which are interchangeably mounted in a standard for coaction with taps of different numbers of flutes, the faces of the gauge head being pre-ground at predetermined angles to form seats for the flutes of the corresponding tap for orienting the tap in the tap-grinding fixture preparatory to the clamping of the tap in the fixture for coaction with a grinder to which the flutes of the tap are presented at the correct angle as a result of the tap-setting operation.

Still another object of my invention is to provide a construction of tap-setting gauge equipped to interchangeably receive gauge heads pre-ground at predetermined angles for coaction with a two-flute tap, a three-flute tap, a four-flute tap, etc., for engaging the tap while loosely gripped in the chuck of a tap-grinding fixture and imparting axial location thereof to positions predetermined to provide the positional setting of the tap which insures the presentation of the tap to a grinding wheel at that angle at which the required sharpening of the tap is effected without manually guiding the tap during the grinding process.

Still another object of my invention is to provide a tap-setting gauge assembly by which a multiplicity of pre-ground gauge heads are utilized to precisely orient the taps, with which the gauge heads are calibrated to coact, to positions at which a grinding operation is performed on the taps with a high degree of precision and without the necessity of utilizing the skill of an experienced machinist for the proper setting of the tap preparatory for the grinding operation.

Still another object of my invention is to provide an arrangement of tap-setting gauge for use in combination with a tap-grinding fixture, whereby only a predetermined limited amount of material of the tap is ground away in producing the required sharpened edges, and there is no appreciable waste of the material of the tap.

Other and further objects of my invention reside in an assembly of tap-setting gauges and fixture therefor for use in the selective setting of taps with which the individual gauges are pre-calibrated, as set forth more fully in the specification hereinafter following, by reference to the accompanying drawings, in which:

Figure 1 is an elevational view showing the tap-setting fixture of my invention in position with respect to a tap-grinding fixture for presentation to a tap-grinding wheel; Fig. 2 is an elevational view of the tap-setting device shown in coaction with a tap of three flutes, where the tap is illustrated in transverse section; Fig. 3 is a vertical sectional view taken substantially on line 3—3 of Fig. 2, the three-flute tap being illustrated in elevation; Fig. 4 is a schematic view showing the three-flute tap as illustrated in Figs. 1–3 presented to the grind wheel while the tap is gripped in the tap-grinding fixture; Fig. 5 illustrates the gauge with a pre-ground anvil head substituted therein for setting of a two-flute tap; and Fig. 6 illustrates an anvil head for the tap-setting gauge of my invention adapted for setting a four-flute tap for orienting the four-flute tap to the precise position required in performing a grinding operation.

My invention is directed to a precision gauge for use in machine shop practice for automatically positioning taps in a tap-grinding fixture for grinding and sharpening operations. I provide a set of anvil heads with the tap-setting gauge where the heads are pre-ground at predetermined angles to coact with taps of different numbers of flutes, that is to say, I provide a pre-ground head for a two-flute tap, a different pre-ground head for a three-flute tap, and still a different pre-ground head for a four-flute tap. The heads are detachably mountable in the spring-pressed gauge and in installing a tap in the chuck I use the correct gauge head for the tap to be set and move the tap into the chuck in a position where it is slightly rotatable in the chuck, that is, the tap is not as yet tightly gripped in the chuck. The spring-pressed setting gauge is then moved to a position beneath the tap and the tap rotated or oriented with the fingers until the tap is seated on the ground surfaces of the spring-pressed head. As thus seated in the gauge, the tap is in the correct position for the chuck to be tightened to solidly grip the tap after which the gauge is slid out from beneath the tap.

An assembly of tap-setting gauges embodying my invention generally consists of a vertical supporting means and a group of at least three anvil heads insertable into the supporting means, that is, an anvil head having adjacent faces extending at angles to each other for receiving and orienting a four-flute tap; a gauge having faces disposed at angles to each other for receiving and orienting a three-flute tap and an anvil having a relatively straight gauge head for receiving and orienting a two-flute tap.

Referring to the drawings in more detail, reference character 1 designates a base support on which there is mounted a tap-grinding fixture and the jig or tool of my invention for orienting the taps which are introduced into the tap grinding fixture and operated upon by the jig or tool of my invention before being tightened into the chuck of the fixture. Inasmuch as it is necessary to explain briefly the nature of the tap-grinding fixture with which the tool or jig of my invention operates, a brief description of the fixture is given herein and reference is made to my co-pending application Serial No. 334,246, filed January 30, 1953, now Patent No. 2,700,854, issued Feb. 1, 1955, for Radial Clearance Tap Grinding Fixture for a more detailed explanation of the fixture.

The fixture is supported by a base 2 attached to the base support 1 by suitable attachment screws 3. The base 2 provides a support for the revolvable bracket 4 which is revolvable about pintle 5 carried by base 2. The vertically extending bracket 4 carries a vertical head 6. A coacting head is mounted for angular movement in vertical head 6 about a horizontal axis. The coacting head which revolves with respect to vertical head 6 carries an arm which terminates in a laterally extending vertical head 7. The laterally extending vertical head 7 provides a support for the cylindrical body 8 which terminates in a flange 9 at one end and is adjustably secured to vertical head 7 by means of fastening screws 10 and 11 so that, upon loosening fastening screws 10 and 11, the cylindrical body 8 may be oriented clockwise or counterclockwise. The body 8 has a cylindrical bore therethrough which receives a pair of eccentric inner and outer sleeves which terminate in flange 12 and flange 14, respectively. The flange 14 abuts against the lateral vertical head 7, while the flange 12 is disposed immediately adjacent the flange 14 and is provided with a wing nut 12a therein to enable flange 12 to be interlocked with the spindle of the tap-grinding fixture. The flange 14 is provided with a set screw 14a which is adjustable there-through for establishing binding relation with the inner eccentric sleeve whereby both eccentric sleeves may be mutually adjusted in eccentric relation, and when such adjustment is secured by mutual orientation of the eccentric sleeves, the assembly is clamped with respect to the cylindrical body 8 by winged head screw 19a. The cylindrical body 8 terminates at its opposite end in an end flange 15 adjacent which the actuating plate 16 is disposed. Actuating plate 16 is keyed to the outer eccentric sleeve and is provided with a manually controllable lever shown at 17 which is angularly shiftable within predetermined limits under control of the indexing plate 18 for moving the spindle 19 in a predetermined orbit for presenting the lands of the tap represented at 20 to the surface of a grinding wheel. The spindle 19 extends through the bore within the inner eccentric sleeve and is secured with respect to indexing plate 18 by means of a key and key-way and a confining nut 21 which engages the screw-threaded end 22 of the spindle 19. The spindle 19 extends longitudinally through the inner eccentric sleeve and carries flange 23 which bears against flange 12 and restricts axial movement of the spindle 19. The spindle 19 carries the chuck shown generally at 24 having gripping jaws 25 which serve to receive and clamp the shank of the tap 20. The indexing plate 18 carries spaced ratchet teeth 18a on the periphery thereof for coaction with an associated detent by which the spindle is oriented through angular distances sufficient to present the tap to the grinding wheel in a position in which a precision grinding operation may be effected.

The jig or tool of my invention consists of the standard 26 which rests upon the base support 1 and is provided with a vertical groove 27 in one side thereof. The vertical groove 27 forms a housing for an expansion coil spring shown at 28 which bears against the lower end wall 27a of groove 27 at one end and against the end of the tongue of the anvil head represented at 29. The tongue of the anvil head 29 is confined for movement in the groove 27 by means of plate 30 which extends over the standard 26 and is secured thereto by removable and replaceable screws shown at 31. The closure plate 30 is longitudinally slotted as represented at 32 and the headed screw 33 has its shank 33a extending through the slot 32 and engaging the tongue of the anvil head 29. Thus the tongue of anvil head 29 is normally projected by means of expansion coil spring 28 to its extreme uppermost position. The anvil head 29 carried by the depending tongue contains coacting surfaces which are preground at predetermined angles to coact with taps of different numbers of flutes. The anvil head shown in the fixture illustrated in Figs. 1, 2 and 3 is constructed for use with three-flute taps as shown at 20 in cross-section in Fig. 2. The coacting faces of the anvil head 29 are shown at 29a and 29b angularly disposed toward each other so that a three-flute tap such as 20, when slightly rotated between the gauge faces 29a and 29b, will reach a position of rest in which the edges of the flutes of the three-flute tap shown at 20 establish lineal contact transversely of the said faces. The tap, when occupying this particular position, is in the proper position for permitting a grinding operation to be performed on its lands to produce accurate ground faces thereon. This is the condition obtained by use of the jig or tool of my invention in coaction with the tap-grinding fixture hereinbefore described; that is to say, the shank of the tap 20, although fitted into the chuck jaws 25, is still free to revolve, and in this condition the anvil head 29 in the tool or jig is located beneath the three-flute tap 20 and the anvil head 29 is released to allow expansion coil spring 28 to project anvil head 29 toward the loosely-fitting tap 20. The tap 20 is grasped by the fingers of the operator and slowly revolved until the position is reached where faces 29a and 29b establish rigid contact with the edges of the flutes of the tap and the tap can revolve no longer. The tap is then tightened solidly in the chuck and the gauge removed, whereupon the grind wheel is advanced to a position in which the faces of the tap are precision ground as the tap is oriented under control of the actuating plate 16 and manually controlled lever 17. This operation is depicted more particularly in Fig. 4 where the grinding wheel 34, driven through shank 35, abrades the lands of the tap performing a precision-grinding operation.

Where a two-flute tap is to be ground, the anvil head 29 is wholly removed from the standard 26 by removing screw 33 and removing plate 30 exposing the expansion coil spring 28 and enabling a replacement anvil head 36 to be inserted in position. The replacement anvil head 36 terminates in a linear face 36a which establishes contact with the flutes of the two-flute tap represented at 37 which while loose within the chuck jaws 25 of the tap-grinding fixture is oriented to a position in which the faces thereof are properly presented to the grinding wheel 34 as the grinding wheel 34 is moved through a path engaging the lands of the tap. In this instance a spring pressed block 36b coacts with the linear face 36a of the anvil head 36 to maintain the two-flute tap in oriented position. Block 36b is slidably supported on guide screws 36c and 36d on which coil springs 36e are mounted and exert a yieldable pressure for orienting tap 37 in the position determined by the angular disposition of face 36a.

Where a four-flute tap is to be ground, it is again necessary to remove the screw 33 and front plate 30 in the jig or tool and to replace the anvil head with the anvil head shown at 38 in Fig. 6 for grinding a four-flute tap which I have represented at 39. In this instance the face 38a of the anvil head 38 is disposed at a predetermined angle so that upon revolving the four-flute tap 39 in the loose jaws of the chuck a position is reached wherein the edges of the flutes occupy a stabilized position which is that position in which the chuck jaws 25 are tightened, whereupon the four-flute tap is positioned for effecting a grinding operation with the tap set in the required angular position.

In each instance the chuck jaws 25 are opened and closed on the shank of the tap using a conventional actuating wrench which fits in radial recess 25a and engages the circular rack 24a of the chuck 24.

The setting of the tap in proper axial alignment within the jaws 25 is incidental to the proper positioning of the tap for movement in an orbital path under control of the eccentricity of the spindle mounting for insuring the proper grinding of the taps.

Each of the anvil heads is provided with the symbol of an indicating arrow marked "wheel" for making clear the fact that the setting operation is performed in relation to the side of the tap on which the grind wheel is presented. This marking may be engraved in the front face of the anvil head together with indicia indicating that the anvil head is used for a three-flute, a two-flute or a four-flute tap.

The angularity of the faces 29a—29b and 38a is determined very precisely so that a three-flute tap or a four-flute tap when slowly rotated between the inclined faces reaches a position of rest with the flutes thereof in solid linear contact with the said faces and beyond which the taps cannot be revolved without disrupting the said linear contacts.

The tool or jig of my invention is so proportioned that the substantially T-shaped head of the device, when projected by the coil spring 28, establishes lineal contact with the edges of the flutes of the tap 20, 37 or 39, permitting the orientation of the taps to setting position while the head is under full control of the expansion coil spring 28 and prior to the projection of the head to its maximum position limited by screw 33 abutting against the upper end of slot 32. That is to say, the measuring head is always biased or spring pressed and in the dynamic state while beneath the flutted tap so that the coil spring is capable of further projecting the head while the flutes of the tap are being oriented about the surfaces thereof. The tool of my invention is used with the head in this floating or biased position and not when the head has been fully projected and is no longer capable of being urged against the lineal edges of the flutes of the tap as the tap is oriented.

I have found the setting gauge of my invention highly practical and successful in operation, and while I have described my invention in one of its preferred embodiments, I realize that modifications in detail may be made, and I desire that it be understood that no limitations upon my invention are intended other than may be imposed by the scope of the appended claims.

What I claim as new and desire to secure by Letters Patent of the United States is as follows:

1. A tool for setting fluted taps in a tap-grinding fixture comprising a standard terminating in a flat top portion and a base portion and having a vertically extending groove therein, a substantially T-shaped member having a laterally disposed head adapted to move from a flat contacting position on the top of said standard to various positions substantially parallel therewith and having a tongue depending downwardly therefrom and extending into said groove, a coil spring housed within said groove beneath said tongue and forming a cushion for the end of the tongue of said substantially T-shaped member and biased to project the said tongue vertically from said standard, means associated with said standard for confining the vertical projection of said tongue with respect to said standard, and faces formed on said substantially T-shaped head for engaging the flutes of a tap disposed horizontally in the jaws of the tap-grinding fixture either in a position capable of free orientation within the jaws or in a position clamped within the jaws whereby the faces on said head are forced into linear contact with the edges of the flutes on the tap for exerting a turning torque thereon for orienting the tap while the tap is mounted for free orientation within the jaws of the tap-grinding fixture to a pre-set position in which the tap may be clamped by the jaws in a position for the precision grinding thereof, the base portion of said standard substantially conforming in transverse dimension with the top portion thereof.

2. A tool for setting fluted taps in a tap-grinding fixture at a predetermined angle for grinding the faces of the taps, comprising a standard terminating in a flat top portion and a base portion and having a vertically disposed slidable member mounted therein, means disposed beneath said member and enclosed by said standard for biasing said slidable member to a projected position above said standard, means for limiting the extent of projection of said member above said standard, said slidable member including a head having ground faces thereon, said faces being lineally engageable with the edges of a fluted tap extending in a horizontal position at a distance above said standard less than the limit of projection of said member from said standard for exerting an axial turning torque thereon and operating to provide setting abutments for the flutes of the tap as the tap is oriented on an axis normal to the plane of said head for selectively fixing the tap in a predetermined oriented position for the precision grinding of the faces thereof, the base portion of said standard substantially conforming in transverse dimension with the top portion thereof.

3. Means for setting fluted taps supported in a substantially horizontally extending position by gripping jaws controllable to either of two conditions, that is, a position permitting orientation of the tap within the gripping jaws and/or a position firmly clamping the tap between the gripping jaws, comprising a gauge including a standard terminating in a flat top portion and a base portion and having a vertically disposed member therein, means forming a seat beneath said member for resiliently projecting the said member in a vertical direction normal to the axis of the fluted tap, and faces on said member engageable with the edges of the fluted tap for exerting a turning torque on the fluted tap for orienting the tap to a position in which the flutes thereon establish lineal contact with said faces in which position the tap may be fixedly clamped in the gripping jaws preparatory for a grinding operation, the base portion of said standard substantially conforming in transverse dimension with the top portion thereof.

4. A gauge for setting fluted taps in a clamping chuck for presentation at a predetermined angle to a grinding wheel comprising a standard having a flat top portion and a base portion, a member slidably supported in the standard for vertical movement through the flat top portion of the standard, means housed within said standard in vertical alignment with said member for biasing said member to a projected position, said member carrying locating faces thereon operative to establish lineal contact with the edges of the flutes of a tap extending substantially normal to the plane of movement of said member, the said faces forming reference planes with respect to which the tap is freely orientatable to a grinding position and preparatory to the rigid clamping of the tap in a fixed position for performing a grinding operation thereon, the base portion of said standard substantially conforming in transverse dimension with the top portion thereof.

5. A gauge for setting fluted taps in a clamping chuck for presentation at a predetermined angle to a grinding wheel as set forth in claim 4 in which said standard includes an open groove in one side thereof for receiving and guiding said member and wherein the means housed within said standard in vertical alignment with said member are disposed in said groove, a plate detachably secured to the side of said standard adjacent said open groove for confining said member and said means for vertical movement in said standard, and means carried by said plate and coacting with said member for restricting the vertical movement of said member.

6. A gauge for setting fluted taps in a clamping chuck for presentation at a predetermined angle to a grinding wheel as set forth in claim 4 in which said standard includes an open groove in one side thereof for receiving and guiding said member and wherein the means housed within said standard in vertical alignment with said member consists of an expansion coil spring seated on the bottom of said groove at one end and abutting against the end of said member at its upper extremity, a plate secured to the side of said standard adjacent said open groove for confining said member and said means for vertical movement in said standard, said plate having a vertical slot adjacent the upper end thereof and a headed screw device secured in said member and extending through the vertical slot in said plate, the slot in said member having a length which defines the limit of movement of said member with respect to said standard and over said coil spring.

References Cited in the file of this patent

UNITED STATES PATENTS

| | | |
|---|---|---|
| 1,794,162 | Flamm | Feb. 24, 1931 |
| 2,413,436 | Dawson | Dec. 31, 1946 |
| 2,420,572 | Southwick et al. | May 13, 1947 |
| 2,552,316 | Guensche | May 8, 1951 |
| 2,578,842 | Rollason | Dec. 18, 1951 |
| 2,626,465 | Reading | Jan. 27, 1953 |

FOREIGN PATENTS

| | | |
|---|---|---|
| 121,859 | Sweden | June 1, 1948 |